Figure 1:
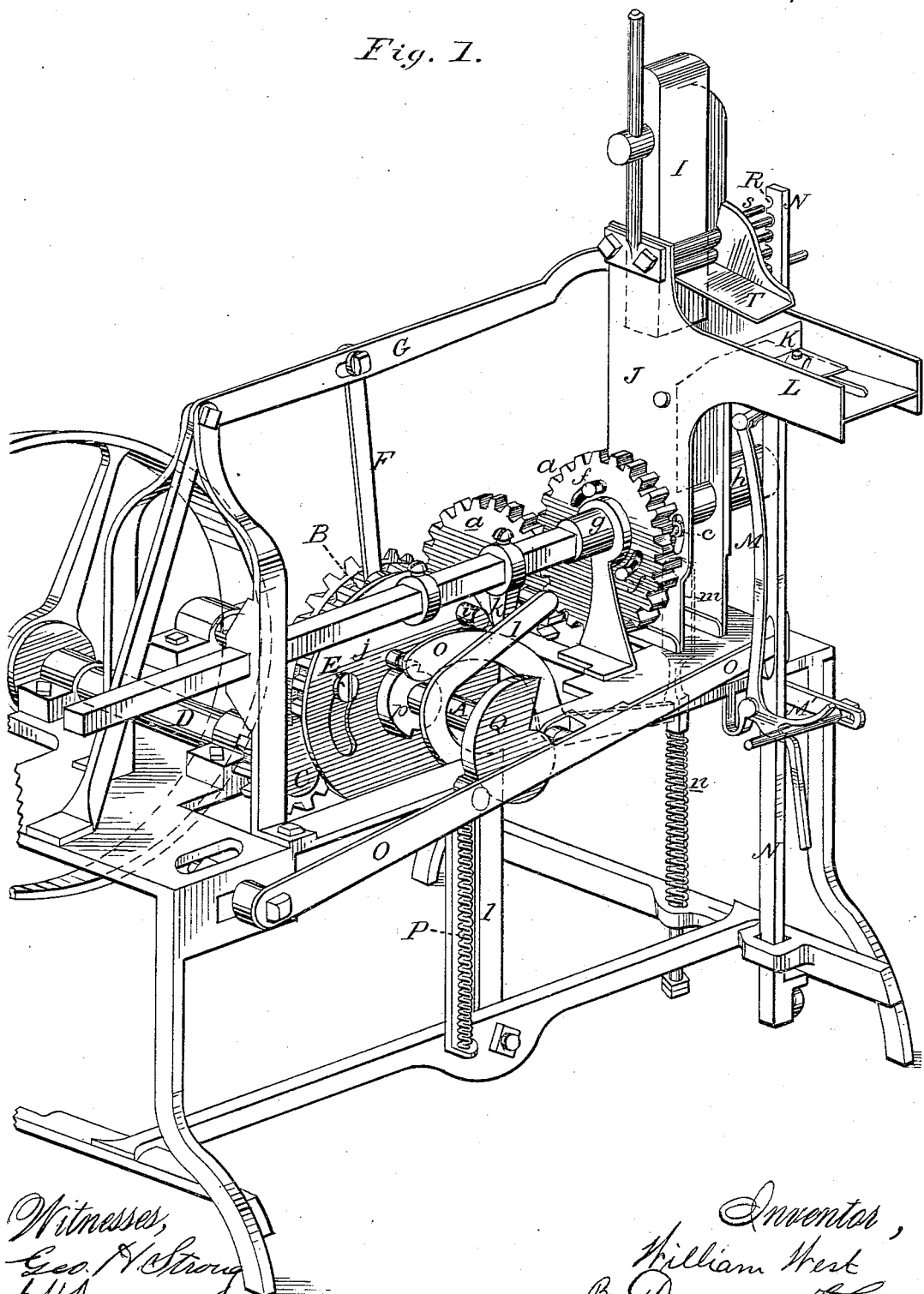

(No Model.)  3 Sheets—Sheet 1.

W. WEST.
CAN FILLING APPARATUS.

No. 259,442. Patented June 13, 1882.

Witnesses,
Geo. H. Strong
D. H. Rouse

Inventor,
William West
By Dewey & Co
Attorneys (No Model.) 3 Sheets—Sheet 2.
W. WEST.
CAN FILLING APPARATUS.
No. 259,442. Patented June 13, 1882.
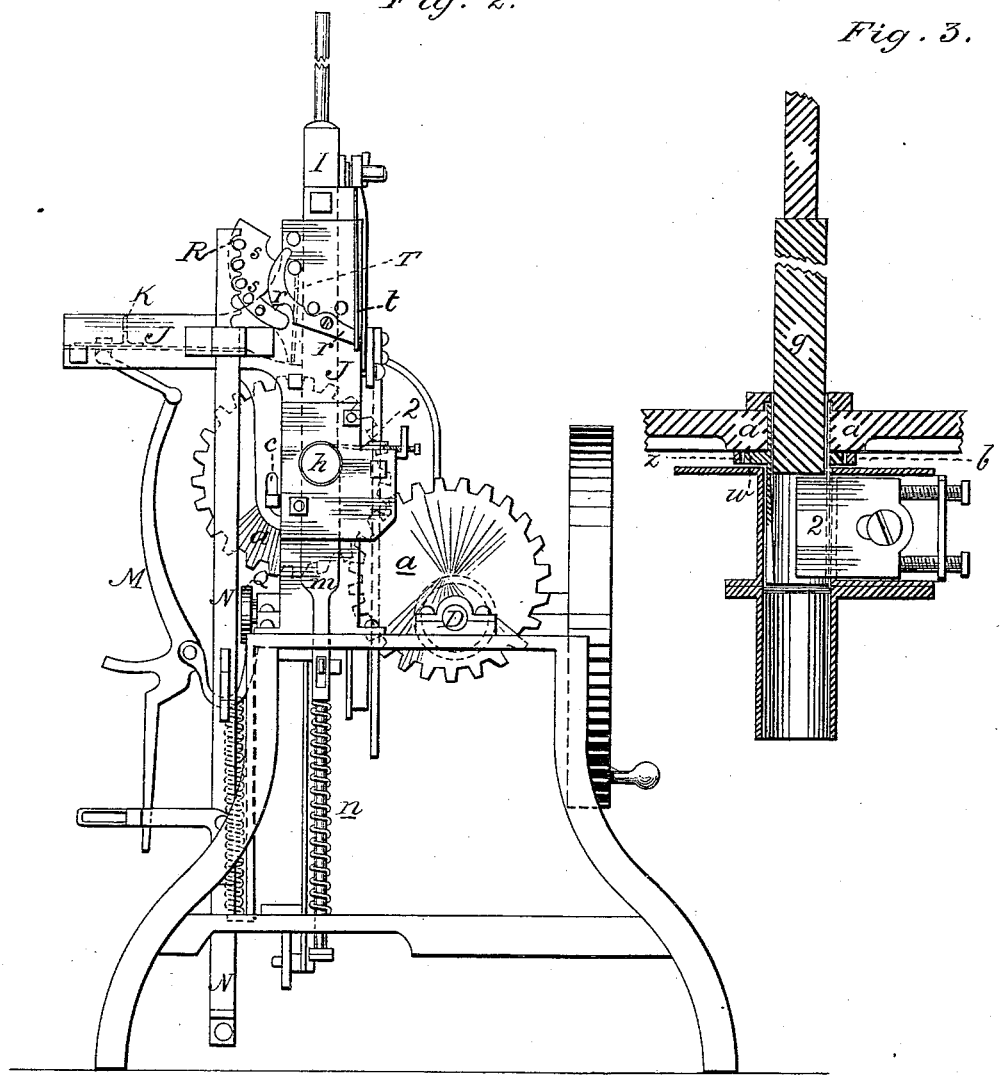
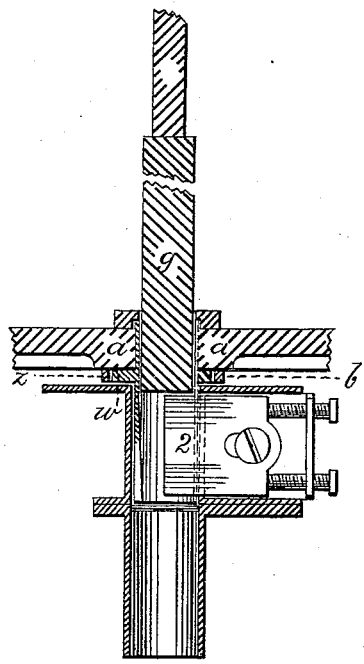
Witnesses,
Geo. H. Strong.
S. H. Nourse
Inventor,
William West
By Dewey & Co
Attorneys (No Model.) 3 Sheets—Sheet 3.
W. WEST.
CAN FILLING APPARATUS.
No. 259,442. Patented June 13, 1882.
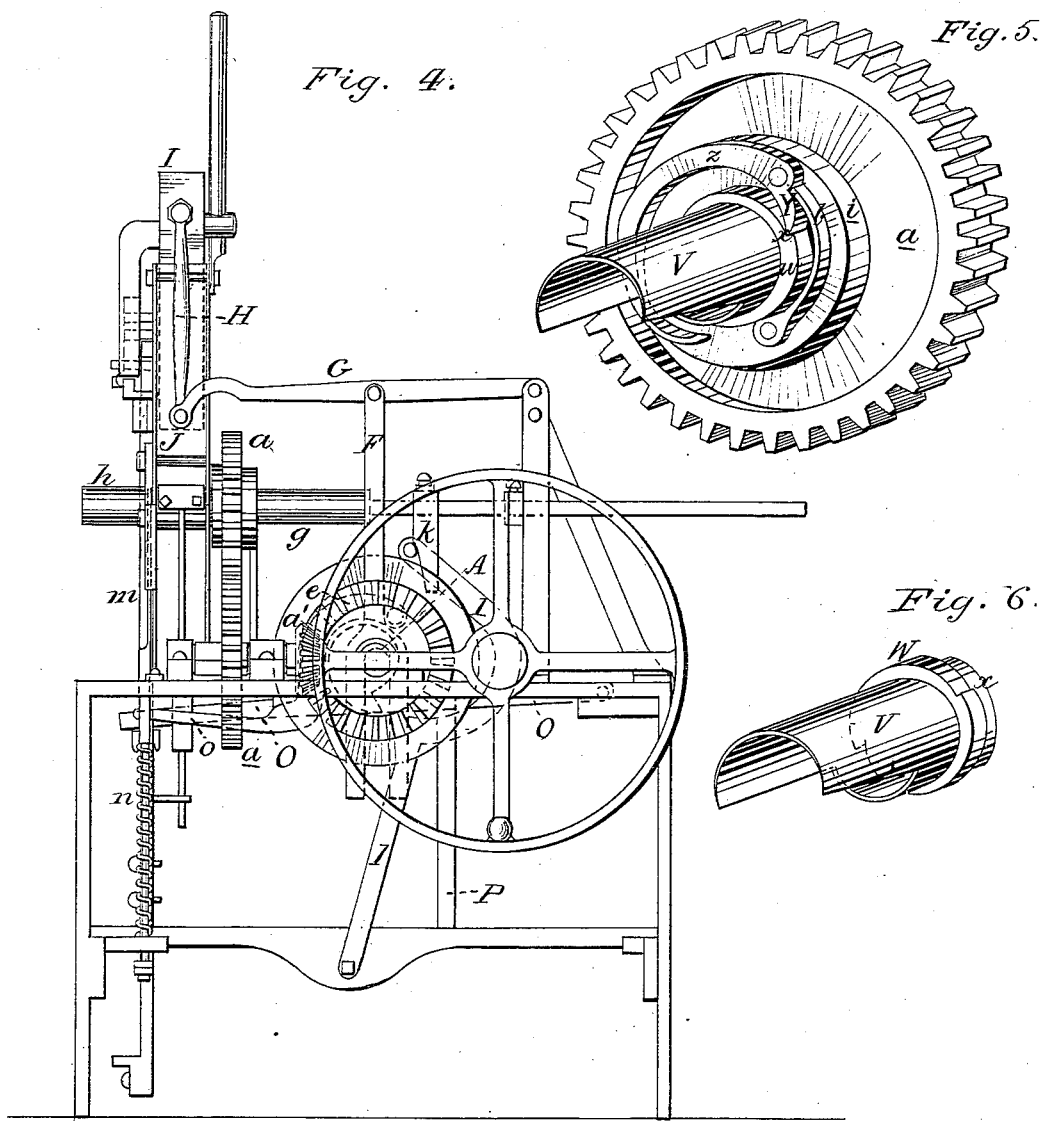
Witnesses,
Geo. H. Strong.
S. H. Nourse
Inventor,
William West
By Dewey & Co.
Attorneys

UNITED STATES PATENT OFFICE.

WILLIAM WEST, OF KEENE, ONTARIO, CANADA.

CAN-FILLING APPARATUS.

SPECIFICATION forming part of Letters Patent No. 259,442, dated June 13, 1882.

Application filed April 11, 1882. (No model.)

*To all whom it may concern:*

Be it known that I, WILLIAM WEST, of Keene, county of Peterborough, Province of Ontario, Canada, have invented an Improved Can-Filling Apparatus; and I hereby declare the following to be a full, clear, and exact description thereof.

My invention relates to that class of apparatus which is employed to pack meat, fish, or other solid substances into cans to be hermetically sealed for the market; and it is an improvement upon an apparatus patented to John West and R. D. Hume, October 19, 1880, of which patent I am sole owner by assignment.

My present improvements consist in certain details of construction by which the material is delivered beneath the vertical plunger in a better manner, the operation of the cutting-knives is more perfect, and the knives less liable to become dulled.

My invention further relates to an improvement in the mechanism by which the different parts are operated.

Referring to the accompanying drawings for a more complete explanation of my invention, Figure 1, Sheet 1, is a general view of the apparatus. Fig. 2, Sheet 2, is an end elevation. Fig. 3, Sheet 2, is an enlarged view of the horizontal knife, which enters the chute just above the rotating cutter. Fig. 4, Sheet 3, is a side elevation. Fig. 5, Sheet 3, is an enlarged view of the revolving cutter and its operating mechanism. Fig. 6, Sheet 3, is an enlarged view of the cylindrical knife V. Fig. 7, Sheet 3, is an elevation of the vertical rod F and disk J.

A is the main shaft, having the spur-gear wheel B fixed to it, and meshing with the pinion C upon the driving-shaft D, by which it is rotated. Upon the shaft A is fixed a cam which actuates a vertical rod, F, having suitable guides and anti-friction roller. This rod has its upper end connected with a horizontal lever-arm, G, one end of which is pivoted to a standard on the table or frame which supports the mechanism, and the other end is connected by a rod or link, H, with the plunger I, so that the rotation of the cam will cause this plunger to be elevated, and its weight, or, if desired, a spring, will carry it down when released. This plunger is guided, as shown, and moves in a corresponding chute, J, to force the fish down into the compression-cylinder below, after the fish has been placed beneath the plunger by a reciprocating carrier, K, which moves in a trough, L, and is operated by a peculiarly-shaped lever-arm, M, notched or forked at M', so as to be driven from the vertically-reciprocating bar N. A horizontal lever, O, actuated by a spring, P, and a cam, Q, on the end of the shaft A, moves the bar N up and down. The upper end of this bar has a rack, R, formed upon it, which engages with teeth S, circularly placed upon one side of a hinged swinging plate, T, and by the vertical reciprocation of this rack the plate T is caused to swing up to admit the forward movement of the carrier K, with the fish which has been placed before it, and after the carrier has been withdrawn it swings down, so as to complete the movement of forcing the fish into the chute, and also to form a wall at that side while the plunger passes down.

The compression-cylinder into which the fish is forced by the plunger I is placed at the bottom of the chute, similarly to the one shown in the patent issued to West and Hume, October, 1880; but the knife V, by which the fish is cut and shaped, is a single one, working entirely in one direction. This knife is in the form of a cylinder, having an opening cut out of one side equal in its dimensions to the size of the chute through which the fish is forced down, and as this cylindrical knife has its open side uppermost when the plunger I is forcing the fish down it receives enough to fill it. The knife then rotates upon its axis sufficiently to cut off the cylinder full and at the same time close it off from the chute. A horizontal knife, 2, is so placed that its edge is opposite to and assists the cylindrical knife. This knife V has a flange, W, upon one end, the flange having notches X X upon opposite sides of its periphery, as shown, and these notches are engaged successively by the point y of a curved cam-shaped lever, Z, which is pivoted to a disk, i, on the side of the eccentric-gear wheel a and rotates with it. A spring, b, holds the point y in contact with the periphery of the flange W, and when, in the rotation of the gear-wheel, it reaches one of the notches X it will fall into it and carry the knife along until the point $y$ is lifted out of the notch by the action of a stationary pin, $c$, on the back of the cam-lever Z, the pin being fixed to the outside of the chute. When this occurs the knife remains stationary until the point $y$ engages the next notch X and again moves the knife. By this action the knife is left stationary when its open side is uppermost and in line with the chute, so as to receive the fish, and again when in the opposite position and while the fish is being forced out of the compression and forming cylinder into the can. The knife is driven at a varying rate of speed by means of the two eccentric gears $a\ a'$, one of which carries the actuating cam-lever, as before described, while the other, $a'$, which is the driver, is mounted upon a shaft, this shaft carrying a bevel-pinion, $d$, and the bevel-gear wheel $e$ upon the main shaft A meshes with and drives it. The disk $i$ upon the side of the eccentric gear $a$ is held and adjusted so as to regulate the movements of the knife by means of a screw, $f$, which passes through slots in the gear $a$, so that it may be moved around the axis, and thus change the position of the cam-lever Z relative to the flange W. The knife is moved slowly when its open side and cutting-edge are downward, and it is moved at its greatest speed when the open side is upward and the inclined cutting-edge is moving across the chute to cut off the supply.

The piston $g$ moves through the center of the cylindrical knife and forces the fish from it into the extension $h$, upon which the can fits, as described in the former patent above referred to. The movement of this piston is effected by means of a pin, $i$, projecting from the disk $j$ on the end of the shaft A, this pin striking an arm, $k$, which projects downward from the guide extending in rear of the pistons.

A bent arm, $l$, pivoted to the frame below, has a pin projecting in front of the arm $k$, and the arm $l$ is acted upon by the pin upon the disk, so as to return the piston after it has been forced forward, in the same manner as shown in former patent.

A vertically-sliding knife or plate, $m$, is forced across the space between the cylindrical forming-knife and the rear part of the extension $h$, upon which the can fits, as soon as the piston has been withdrawn past that point, and thus closes the end of the cylindrical knife and former for the introduction of another charge by the plunger moving in the chute. The sliding knife $m$ has a stem projecting downward, and a spiral or other spring, $n$, acts against a pin or shoulder to return the knife after it has been drawn down and then released. The knife is drawn down out of the cylinder by means of an arm, $o$, one end of which is connected with the stem of the knife, while the opposite end is curved and brought into such a position relative to a cam, $p$, upon the main shaft that as the shaft rotates, the cam acts upon the lever, moving it about its fulcrum until the knife is drawn down, and then releases it, so that the spring throws it back again.

When the supply of fish within the vertical chute is sufficient the swinging gate T is prevented from opening by a latch, $r$, a notch in which engages one of the pins or teeth S, (by which and the rack R it is operated,) and thus holds it against the action of the spring P until the latch is tripped and the gear released. As long as the chute contains a quantity of fish the plunger I will not descend very low; but as soon as the quantity diminishes to a certain point an arm, $t$, which is secured to the upper part of the plunger and moves with it, passing down outside the chute, will strike the rear end of the latch $r$, and thus disengage it, so that the gate can operate. The cam which moves the lever by which the plunger is actuated may be turned upon the shaft, so as to regulate the movement of the plunger, by means of a screw, E$'$, passing through a slot in a disk upon the main shaft, the cam lying in contact with the disk.

Having thus described my invention, what I claim as new, and desire to secure by Letters Patent, is—

1. In a can-filling apparatus, and in combination with the vertical fish-receiving chute J and the vertically-reciprocating plunger I, guided as shown, the cam E, adjustable upon the driving-shaft, the vertical rod F, the lever-arm G, and the connecting rod or link H, substantially as and for the purpose herein described.

2. The horizontal trough L, opening into the upper part of the chute J, in combination with the reciprocating carrier K, moving in said trough, so as to transfer the fish into the vertical chute, substantially as herein described.

3. In combination with the carrier K, moving in the trough L, the lever-arm M, connected with the carrier by a link, and having the fork or notch M$'$, in combination with the vertically-reciprocating bar N, substantially as herein described.

4. The hinged swinging gate T, opening or closing the passage between the trough L and chute J, and having the toothed segment S, in combination with the reciprocating bar N, with its rack R, engaging said segment, substantially as herein described.

5. The bar N, moving in guides, as shown, in combination with the lever O, cam Q, and spring P, substantially as and for the purpose herein described.

6. The cylindrical receiver, having one side open and the edge forming a knife, V, so that a supply of fish may be forced through the opening from the chute J, and cut off and formed to enter the can by the rotation of the knife, substantially as herein described.

7. The cylindrical knife and shaper V, turning within the chute J, and provided with the notched flange W, in combination with the curved lever Z and rotating gear-wheel $a$, substantially as herein described.

8. In combination with the cylindrical knife and shaper V, with its notched flange W, and curved operating-lever Z, the disk $i$, supporting the lever, and adjustable upon the gear $a$ by slots and screws $f$, so as to regulate the movements of the knife, substantially as herein described.

9. The cylindrical knife and shaper V, with its notched flange, and the curved pivoted lever Z, and spring $b$, rotated by the gear-wheel $a$, in combination with the stationary pin $c$, whereby the pawl $y$ is disengaged at each semi-revolution of the knife, substantially as herein described.

10. In combination with the hollow rotating knife and former V, operating within the chute J, as shown, the eccentric gears $a$ $a'$, meshing with each other to drive the knife with a variable speed, substantially as herein described.

11. In combination with the hollow intermittently-rotating cylindrical knife and former V and the eccentric driving-gears $a$ $a'$, the piston $g$, reciprocating through the cylindrical knife and the sleeve upon which the gear $a$ turns, and the stem or extension $h$, operating lever and cam, substantially as herein described.

12. The hinged swinging gate T, toothed segments S, and vertically-moving bar N and rack R, in combination with the latch $r$ and the arm $t$, connected with the plunger, substantially as and for the purpose herein described.

In witness whereof I have hereunto set my hand.

WILLIAM WEST.

Witnesses:
S. H. NOURSE,
G. W. EMERSON.